US011251699B2

(12) United States Patent
Lettner et al.

(10) Patent No.: US 11,251,699 B2
(45) Date of Patent: Feb. 15, 2022

(54) RELAY AND BATTERY SYSTEM INCLUDING THE SAME

(71) Applicant: SAMSUNG SDI CO., LTD., Yongin-si (KR)

(72) Inventors: Markus Lettner, Wettmannstaetten (AT); Michael Schlick, Graz (AT); Sebastian Vogel, Bredstedt (DE)

(73) Assignee: SAMSUNG SDI CO., LTD., Yongin-si (KR)

(*) Notice: Subject to any disclaimer, the term of this patent is extended or adjusted under 35 U.S.C. 154(b) by 304 days.

(21) Appl. No.: 16/438,069

(22) Filed: Jun. 11, 2019

(65) Prior Publication Data

US 2019/0386562 A1    Dec. 19, 2019

(30) Foreign Application Priority Data

Jun. 15, 2018  (EP) .................................. 18177946
May 27, 2019  (KR) ..................... 10-2019-0062127

(51) Int. Cl.
*H02M 1/44*    (2007.01)
*B60L 50/60*   (2019.01)

(52) U.S. Cl.
CPC ............. *H02M 1/44* (2013.01); *B60L 50/66* (2019.02); *B60L 2210/40* (2013.01)

(58) Field of Classification Search
CPC . H02M 1/44; H02M 1/36; B60L 50/66; B60L 2210/40; B60L 2270/147; B60L 3/04; B60L 58/20; B60L 11/1803; Y02T 10/70; Y02T 10/62; H01H 50/00; H01H 50/14; H01H 59/0009; H01H 9/167; H01H 47/002
See application file for complete search history.

(56) References Cited

U.S. PATENT DOCUMENTS

| 1,402,240 | A | 1/1922 | Masters |
| 2,423,135 | A | 7/1947 | Yule |
| 2006/0061442 | A1* | 3/2006 | Brooks ................ H01H 3/222 335/220 |
| 2008/0211465 | A1* | 9/2008 | Kung ..................... H02M 1/36 323/222 |

(Continued)

FOREIGN PATENT DOCUMENTS

| CA | 220037 A | 6/1922 |
| CA | 309513 A | 3/1931 |

(Continued)

OTHER PUBLICATIONS

Extended European Search Report corresponding to EP 18177946.3, dated Dec. 6, 2018, 8 pages.

(Continued)

*Primary Examiner* — John W Poos
*Assistant Examiner* — Alex W Lam
(74) *Attorney, Agent, or Firm* — Lewis Roca Rothgerber Christie LLP

(57) ABSTRACT

A relay including a relay coil and a relay switch. The relay coil including a coil beginning and a coil end and being connected to a relay driving circuit. The relay switch being arranged in a load circuit. A first parasitic capacitance between the coil beginning and the relay switch is different than a second parasitic capacitance between the coil end and the relay switch.

17 Claims, 4 Drawing Sheets

(56) References Cited

U.S. PATENT DOCUMENTS

| | | | |
|---|---|---|---|
| 2013/0342292 A1* | 12/2013 | Choi | ............... H01H 50/00 335/192 |
| 2017/0222428 A1 | 8/2017 | Choi | |
| 2017/0302091 A1 | 10/2017 | Schaedlich et al. | |
| 2018/0123363 A1* | 5/2018 | Kim | ............... H01M 10/615 |

FOREIGN PATENT DOCUMENTS

| | | |
|---|---|---|
| CA | 425734 A | 2/1945 |
| CA | 840625 A | 4/1970 |
| CN | 103107046 A | 5/2013 |
| CN | 203787352 U | 8/2014 |
| CN | 204332835 U | 5/2015 |
| CN | 206099325 U | 4/2017 |
| DE | 10 2014 219211 A1 | 3/2016 |
| EP | 3 203 491 A1 | 8/2017 |
| FR | 2 076 814 A5 | 10/1971 |
| JP | 05-047280 A | 2/1993 |
| KR | 10-2007-0096358 A | 10/2007 |
| WO | WO 2014/206375 A1 | 12/2014 |

OTHER PUBLICATIONS

European Patent Office Action for corresponding European Patent Application No. 18 177 946.3, dated Jan. 29, 2020, 5 pages.

* cited by examiner

RELAY AND BATTERY SYSTEM INCLUDING THE SAME

CROSS-REFERENCE TO RELATED APPLICATION

This application claims priority to and the benefit of Korean Patent Application No. 10-2019-0062127, filed in the Korean Intellectual Property Office on May 27, 2019, and European Patent Application No. 18177946.3, filed in the European Patent Office on Jun. 15, 2018, the entire contents of all of which are incorporated herein by reference.

BACKGROUND

1. Field

Aspects of embodiments of the present invention relate to a relay and a battery system including the relay.

2. Description of the Related Art

A rechargeable (or secondary) battery differs from a primary battery in that it is designed to be repeatedly charged and discharged, while the latter is designed to provide an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction between the positive electrode, the negative electrode, and the electrolyte solution. The shape of the case, for example, a cylindrical or rectangular shape, depends on the battery's intended purpose.

Rechargeable batteries may be (or may be a part of) a battery module including multiple battery submodules, each including battery cells coupled to each other in series and/or parallel to provide a relatively high energy density, such as for a hybrid vehicle. Such battery modules may be mechanically and electrically integrated, may include a thermal management system, and may be configured to communicate with each other and with one or more electrical consumers to form a battery system.

To meet the dynamic power demands of various electrical consumers connected to the battery system, static control of battery power output and charging may not be sufficient. Thus, steady or intermittent exchange of information between the battery system and the controllers of the electrical consumers may be employed. This information includes the battery system's actual state of charge (SoC), potential electrical performance, charging ability, and internal resistance as well as the consumers' actual or predicted power demands or surpluses.

To monitor, control, and/or set the aforementioned parameters, a battery system generally includes a control unit (e.g., a controller), such as a battery management unit (BMU) and/or a battery management system (BMS). Such control units may be an integral part of the battery system disposed within a common housing or may be part of a remote control unit that communicates with the battery system via a suitable communication bus. In both cases, the control unit may communicate with the electrical consumers via a suitable communication bus, for example, a CAN or SPI interface.

The BMS/BMU may further communicate with each of the battery submodules, for example, with a cell supervision circuit (CSC) of each of the battery submodules. The CSC may be further connected to a cell connection and sensing unit (CCU) of one or more of the battery submodules that may interconnect the battery cells within the respective battery submodules.

A battery system may further include a protection system to provide voltage level control of a power interface of the battery system and to enable fast and reliable safety shutdown of the power interface in the case of non-permissible operating conditions. Such a protection system may be configured to shut down a power connection between the battery system and an external terminal of the battery system. The protection system may include an electromechanical switch that is generally controlled by a microcontroller (MCU) of the battery system.

Usually, one or more relays that are controlled by a suitable relay driver circuit are utilized as the electromechanical switch of such a protection system. To supply the actual required current to the relays (e.g., the switching current, holding current, and/or excess current), relay coil of the relays may be operated by a pulse width modulation (PWM) controlled driver. Due to the PWM control, ripple currents may be generated in the relay driving circuit and may perpetuate to the controlled load circuit, for example, to the circuit in which the relay switch is arranged. Perturbations from the load circuit may adversely affect the control relay driver circuit and, hence, the protection system.

It is thus an object of embodiments of the present invention to provide a relay, such as a relay for a battery system, having improved electromagnetic compatibility (EMC), for example, a relay that has less unwanted emission of electromagnetic interference (EMI) and/or is less susceptible to EMI or other disturbances.

SUMMARY

One or more of the drawbacks of the prior art are avoided or at least mitigated according to embodiments of the present invention. According to a first embodiment of the present invention, a relay is provided. The relay includes a relay coil, a relay switch, and a relay driving circuit. The relay driving circuit is configured to operate the relay coil to set the relay switch into either a conductive or a non-conductive state. The relay may include further components that are required to drive the relay, and one of ordinary skill in the art is aware of common relays and their common components. As such, description of such well-known components may be omitted for clarity.

A relay according to an embodiment of the present invention includes a relay coil having a coil beginning and a coil end, both of which are connected to a relay driving circuit. The coil beginning refers to a first terminal end of the wire forming the coil, and the coil end refers to the other terminal end (e.g., the second terminal end) of that wire. The wire may be wound on (e.g., around) a coil core by using one of wild winding, helical winding, or orthocyclic winding. However, in some embodiments, the coil beginning may refer to an innermost layer of coil windings, and the coil ending may refer to an outermost layer of coil windings, for example, when both terminal ends of the coil wire are led away from an innermost or outermost surface of the coil. In some embodiments, the coil includes multiple layers of coil windings in (e.g., stacked on each other in) a radial direction. The relay coil may be a hollow cylindrical coil with a coil wire wound around a hollow cylindrical core. Further, the coil wire may be wound on the core starting with the coil beginning, which forms an innermost layer, and extends until the coil end is laid on an outermost layer.

The relay according to an embodiment of the present invention further includes a relay switch that is disposed in a load circuit. The relay switch is configured to either close the load circuit to allow a current to flow through the load circuit (e.g., a closed state) or to open the load circuit to cut a current through the load circuit (e.g., an open state). The operation of the relay switch (e.g., moving it between the closed state and the open state) is actuated via the relay coil (e.g., by generating a magnetic field in the relay coil) to move and hold the relay switch in one of the aforementioned positions. The skilled person is aware of common relay switches.

According to embodiments of the present invention, a first parasitic capacitance is formed between the coil beginning and the relay switch, and a second parasitic capacitance is formed between the coil end and the relay switch. For example, a capacitance exists between the relay switch and each of the coil beginning and the coil end because of their proximity to each other. When a parasitic capacitance is formed continuously between the coil wire and the relay switch, the first parasitic capacitance and the second parasitic capacitance have extreme values (e.g., minimum and maximum values) of the continuous parasitic capacitance.

According to embodiments of the present invention, the first parasitic capacitance is different from the second parasitic capacitance. For example, the relay coil according to embodiments of the present invention is not symmetric with respect to the transfer functions between the relay coil terminals (e.g., the coil beginning and the coil end) and the relay switch. This asymmetry can be utilized to optimize the electromagnetic compatibility of a relay (e.g., a driving circuit) by utilizing the difference in parasitic capacitance to generate directed transmission paths for electromagnetic interference (EMI). The relay according to embodiments of the present invention bocks, attenuates, and/or dissipates EMI by exploiting the difference between the first and second parasitic capacitances.

According to one embodiment of the relay, the relay switch includes a relay pallet. The relay pallet refers to the moving part of the relay upon which the magnetic force predominantly acts for actuating (e.g., closing or opening) the relay switch in order to cut or connect relay working contacts in the load circuit. When a current is supplied to the relay coil to generate an attractive magnetic field, the relay pallet is drawn nearer to the relay coil. In some relays, the relay pallet may even dive (or move) at least partially into a cylindrical cavity of the relay coil. The relay pallet may be formed integrally with the relay switch and may, thus, be considered to form a part of the load circuit. The parasitic coupling capacitance between the relay pallet (e.g., a relay armature) and the terminal ends of the relay coil (e.g., the coil beginning as well as the coil end) significantly contributes to unwanted crosstalk between the relay driving circuit and the load circuit that is controlled by the relay.

By considering the difference between the first parasitic capacitance between the coil beginning and the relay pallet and the second parasitic capacitance between the coil end and the relay pallet, the crosstalk between the relay driving circuit and the load circuit can be effectively influenced by choosing (e.g., by arranging) the polarity of the relay coil in the relay driving circuit. Herein, the polarity of the coil refers to the orientation of the coil terminals within the relay driving circuit. By selecting (or orienting or arranging) the coil's polarity based on the specific application case as discussed below, the electromagnetic compatibility of the relay driving circuit can be commensurably improved.

The smaller one of the first parasitic capacitance and the second parasitic capacitance may be disposed in a capacitive coupling path of electromagnetic interference between the relay driving circuit and the load circuit. For example, the smaller parasitic capacitance is formed (or arranged) between the relay switch (e.g., the relay pallet) and one of the coil beginning and the coil end. In a helically wound coil as described above in which the coil beginning is part of an innermost layer, when the pallet is drawn towards the cylindrical cavity of the relay coil, a capacitive coupling path is formed between the coil end and the relay pallet. When the smaller one of the first and the second parasitic capacitance is disposed in this coupling path, the coupling impedance between the relay switch (e.g., the relay pallet) and the relay coil (e.g., the coil beginning) is increased. Hence, EMI is less effectively transferred between the relay coil and the relay switch (e.g., the relay pallet) along that capacitive coupling path.

By choosing (or arranging) the relay coil's polarity such that the smaller parasitic capacitance between one of the coil's terminal ends and the relay switch (e.g., the relay pallet) is disposed in a particularly harmful, unwanted, and/or strongest transmission path of electromagnetic interference, the coupling attenuation across this transmission path and, consequently, coupling attenuation between the relay driving circuit and the load circuit are improved. In some embodiments, the second parasitic capacitance is smaller than the first parasitic capacitance. Then, the second parasitic capacitance is disposed in a capacitive coupling path of electromagnetic interference between the relay driving circuit and the load circuit.

In another embodiment, the larger one of the first parasitic capacitance and the second parasitic capacitance is disposed in a capacitive coupling path of electromagnetic interference between the relay driving circuit and the load circuit. For example, the larger parasitic capacitance is formed between the relay switch (e.g., the relay pallet) and one of the coil beginning and the coil end. In a helically wound coil as described above in which the coil beginning is part of an innermost layer, when the pallet is drawn towards the cylindrical cavity of the relay coil, a capacitive coupling path is then formed between the coil beginning and the relay switch (e.g., the relay pallet). As the larger one of the first and the second parasitic capacitance is disposed in such coupling path, the coupling impedance between the relay switch (e.g., the relay pallet) and relay coil (e.g., the coil end) along this coupling path is decreased. Hence, in this embodiment, the EMI is more effectively transferred between the relay coil and the relay switch (e.g., the relay pallet) along the specific capacitive coupling path.

By choosing (or arranging) the relay coil's polarity such that the larger parasitic capacitance between one of the coil's terminal ends and the relay switch (e.g., the relay pallet) is disposed in specific transmission path of electromagnetic interference, the coupling across this transmission path is increased and, hence, interference between the relay driving circuit and the load circuit is predominantly transferred via this coupling path, for example, to be dissipated to ground. Thus, by disposing the larger parasitic capacitance in a coupling path that terminates at or near an electric ground, a bleeding resistor, or a rather insensitive circuit or circuit component, EMI can be intentionally conducted away from more sensitive circuits or circuit components. In some embodiments, the first parasitic capacitance is larger than the second parasitic capacitance. Then, the first parasitic capacitance is disposed in a capacitive coupling path of electromagnetic interference between the relay driving circuit and the load circuit.

In one embodiment of the relay driving circuit, one of the coil beginning and the coil end is connected to ground via a third node and a switch. The switch is controlled by a PWM controller and is configured to close a current path across the relay coil based on a variable width pulse-shaped signal. The other one of the coil beginning and the coil end is connected to a supply voltage via a fourth node. A relay driving circuit according to this embodiment allows for PWM-based control of the relay coil and, thus, the relay switch. In some embodiments, a freewheeling diode is connected in parallel to the relay coil between the third node and the fourth node. According to this embodiment, power dissipation in the relay coil is reduced while holding the relay switch after closing (e.g., while holding the relay switch in the closed state). The supply voltage of the relay driving circuit may be lower than a voltage in the load circuit.

According to this embodiment, a source of electromagnetic interference between the relay driving circuit and the load circuit may be disposed in the relay driving circuit. For example, a significant (e.g., a most significant) EMI or disturbance source is disposed within the relay driving circuit. As an example, signals emitted from the PWM controller and/or generated by switching the switch of the relay driving circuit generate significant disturbances in the relay driving circuit that influence the load circuit as EMI. This may occur when the voltage of the load circuit is not significantly larger than that of the relay driving circuit, such as with a 48 V load circuit and a 12 V relay driving circuit. According to this embodiment, the smaller one of the first parasitic capacitance and the second parasitic capacitance is connected to the third node such that transmission of the PWM signal from the relay driving circuit to the load circuit is impeded. Hence, in this embodiment, the relay coil's end is connected to the third node.

In another embodiment, a source of electromagnetic interference between the relay driving circuit and the load circuit may be disposed in the load circuit. For example, a significant EMI or disturbance source is disposed within the load circuit. As some examples, high voltage and/or high frequency signals emitted within the load circuit generate significant disturbances that influence the relay driving circuit as EMI. This may occur when the voltage of the load circuit is significantly larger than that of the relay driving circuit, such as with a 400 V load circuit and a 12 V relay driving circuit. According to this embodiment, the smaller one of the first parasitic capacitance and the second parasitic capacitance is connected to the fourth node. Hence, the larger one of the first parasitic capacitance and the second parasitic capacitance is connected to the third node such that any EMI transmitted from the load circuit is mainly conducted to a ground and deterioration of the driver circuit's supply voltage is substantially avoided. Hence, in this embodiment, the relay coil's beginning is connected to the third node, and the relay coil's end is connected to the fourth node.

Another embodiment of the present invention relates to a battery system including a plurality of battery cells that are electrically connected to each other in series between a first node and a second node and a relay according to one or more of the above-described embodiments of the present invention. The load circuit is configured to connect the battery cells to one or more external loads. Further, the relay switch is disposed in the load circuit such that it is interconnected between one of the first node and the second node and the external load(s). The relay driving circuit, the relay coil, and the relay switch may form a protection system of the battery system, such as an overcurrent or overheating protection system. Therefore, the relay driving circuit may further include input nodes for receiving an input signal related to one or more of a voltage, a current, and a temperature of at least one battery cell of the battery system and may be configured to open or close the relay switch according to this input signal. Further, the relay driving circuit may an integral part of a BMS or BMU of the battery system.

According to one embodiment of the battery system, an inverter in the load circuit is a source of electromagnetic interference between the relay driving circuit and the load circuit. For example, the inverter may be a most significant EMI or disturbance source of the battery system. This might occur, for example, in a high voltage (HV) battery system that provides a voltage of, for example, about 400 V, when the relay driving circuit operates in a low voltage (LV) domain. According to this embodiment, the smaller one of the first parasitic capacitance and the second parasitic capacitance is connected to the fourth node. In some embodiments, the second parasitic capacitance, (e.g., the relay coil end) is connected to the fourth node. The larger parasitic capacitance (e.g., the first parasitic capacitance) is connected to the third node (e.g., the coil beginning is connected to the third node). Thus, any EMI transmitted from the load circuit is primarily conducted away to a ground via the larger first parasitic capacitance and the third node and deterioration of the supply voltage is substantially avoided.

Another embodiment of the present invention relates to a vehicle including a relay and/or a battery system according to one or more of the above-described embodiments of the present invention. The vehicle may be an electric vehicle (EV) or a hybrid vehicle (HV) that is at least partially powered by the battery system. In such a vehicle, further current paths may be considered to optimize the EMC of the battery system, such as, for example, current paths connecting the relay driving circuit to other electric circuits in the vehicle via the first or second parasitic capacitance, such as, for example, circuits related to an infotainment system, to vehicle control units, or the like. Even the vehicle chassis may be considered as part of a capacitive coupling path including one of the first or second parasitic capacitance that may be manipulated (or utilized) to reduce or attenuate EMI.

Another embodiment of the present invention relates to a method for improving the electromagnetic compatibility of a relay. The relay may include a relay coil with a coil beginning and a coil end, both connected to a relay driving circuit as described above. The relay may further include a relay switch that is disposed in a load circuit, and the load circuit may be part of a battery system. The method may include determining a first parasitic capacitance between the coil beginning and the relay switch and determining a second parasitic capacitance between the coil end and the relay switch. The parasitic capacitances may be determined by modelling the relay coil in its specific application case.

In another embodiment, the parasitic capacitances may be determined experimentally. For example, perturbations with a characteristic timeline may be applied to the load circuit at different frequencies, and signals received at the terminal ends of the relay coil may be spectrally analyzed for the transmitted components (e.g., frequency response) of the perturbations. From such measurements, the transfer functions and, finally, parasitic capacitances between the load circuit and the coil beginning and the coil end, respectively, may be determined. Perturbations may be also applied to each of the coil beginning and the coil end, and the frequency response may be measured in the load circuit such that parasitic capacitances may be determined therefrom.

The method according to embodiments of the present invention further includes determining the electromagnetic interference (EMI) between the relay driving circuit and the load circuit (e.g., EMI from the relay driving circuit to the load circuit as well as EMI from the load circuit to the relay driving circuit). The EMI may be determined by modelling the relay coil in its specific application case. In another embodiment, the EMI may also determined experimentally, which may include spectral analysis of received signals at the coil beginning, the coil end, and in the load circuit but without applying additional perturbations. Detected crosstalk in either the relay driving circuit or the load circuit may then be connected to specific components, such as, for example, a PWM controller of the relay driving circuit or an inverter of the load circuit by correlating the detected crosstalk with the signal patterns of such components. The determining EMI between the relay driving circuit and the load circuit may further include determining a most significant or particularly harmful EMI between these circuits.

Lastly, the polarity of the relay coil in the relay driving circuit may be determined according to the determined first parasitic capacitance, the determined second parasitic capacitance, and the determined electromagnetic interference, such as the determined most significant electromagnetic interference. Determining the polarity of the relay coil refers to choosing which terminal end of the relay coil is to be connected to a specific node of the relay driving circuit. As described in more detail above, by choosing (or arranging) the polarity of the relay coil, the transmission of EMI between the relay driving circuit and the load circuit may be influenced by, for example, attenuating EMI along a specific transmission path or by directing EMI transmission along a certain transmission path.

In one embodiment, the method according to embodiments of the present invention may further include disposing the smaller one of the first parasitic capacitance and the second parasitic capacitance in a capacitive coupling path of electromagnetic interference between the relay driving circuit and the load circuit to attenuate the electromagnetic interference transmitted across the capacitive coupling path. Further, the method may include disposing the smaller parasitic capacitance in a certain capacitive coupling path between a node of the relay driving circuit and the load circuit by connecting the respective terminal end of the relay coil to that node of the relay driving circuit. In some embodiments, the method may include connecting the coil end to a node of the relay driving circuit to or from which transmission of electromagnetic interference should be attenuated.

In another embodiment, the method may further include disposing the larger one of the first parasitic capacitance and the second parasitic capacitance in a capacitive coupling path of electromagnetic interference between the relay driving circuit and the load circuit to conduct the electromagnetic interference away via that capacitive coupling path. Further, the method may include disposing the larger parasitic capacitance in a certain capacitive coupling path between a node of the relay driving circuit and the load circuit by connecting the respective terminal end of the relay coil to that node of the relay driving circuit. The method may include connecting the coil beginning to a node of the relay driving circuit to or from which electromagnetic interference should be conducted away more efficiently.

In another embodiment of the present invention, the capacitive coupling paths that are considered by determining the parasitic capacitances and electromagnetic interference along this coupling path may extend above the relay driving circuit and the load circuit. In an application case of a battery system of an electric vehicle, the capacitive coupling path may include the vehicle chassis and/or other electric circuits in the vehicle.

Further aspects and features of the present invention will be learned from the dependent claims and the following description of example embodiments.

BRIEF DESCRIPTION OF THE DRAWINGS

Aspects and features of the present invention will become apparent to those of ordinary skill in the art by describing, in detail, exemplary embodiments thereof with reference to the attached drawings in which.

DETAILED DESCRIPTION

Figure 1:
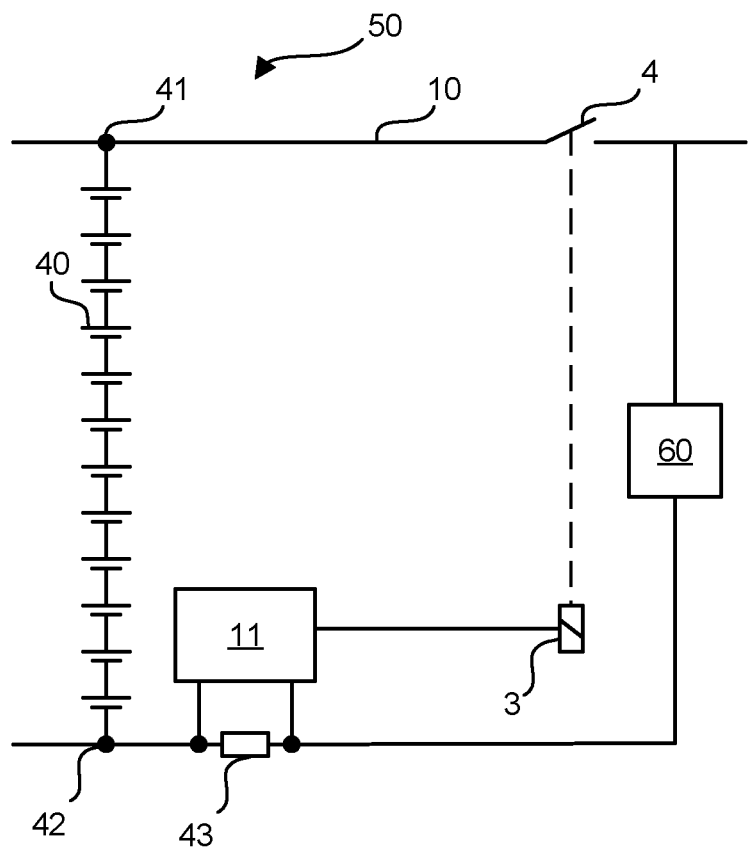
FIG. 1 is a schematic illustration of a battery system according to an embodiment.

Reference will now be made in detail to example (or exemplary) embodiments, which are illustrated in the accompanying drawings. Aspects and features of the exemplary embodiments, and implementation methods thereof, will be described with reference to the accompanying drawings. In the drawings, like reference numerals denote like elements, and redundant descriptions thereof may be omitted. The present invention, however, may be embodied in various different forms and should not be construed as being limited to the illustrated embodiments. Further, descriptions of processes, elements, and techniques that are well-known by those having ordinary skill in the art (e.g., descriptions of processes, elements, and techniques that are not considered necessary for those having ordinary skill in the art to have a complete understanding of the aspects and features of the present invention) may be omitted. Further, in the drawings, the relative sizes of elements, layers, and regions may be exaggerated for clarity.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

Also, the term "exemplary" is intended to refer to an example or illustration. As used herein, the terms "use," "using," and "used" may be considered synonymous with the terms "utilize," "utilizing," and "utilized," respectively.

It will be understood that although the terms "first," "second," etc. may be used to describe various elements, these elements should not be limited by these terms. These terms are used to distinguish one element from another element. For example, a first element may be named a second element and, similarly, a second element may be named a first element, without departing from the scope of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include plural forms unless the context clearly indicates otherwise.

As used herein, the terms "substantially," "about," and similar terms are used as terms of approximation and not as terms of degree and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5%.

FIG. 1 is a schematic view of a battery system 50 according to an embodiment. In the battery system 50, ones of a plurality of battery cells 40 are connected to each other in series between a first node 41 and a second node 42. The battery cells 40 may also be connected to each other in parallel between the first node 41 and the second node 42, forming an XsYp configuration between these nodes 41, 42. In some embodiments, battery submodules may be connected between these nodes 41, 42.

Each of the twelve battery cells 40 may provide a voltage of approximately 4 V such that a voltage VDD of approximately 48 V is applied (e.g., is generated or transmitted) between the first node 41 and the second node 42. However, other voltages may be applied between the first node 41 and the second node 42. An external load 60 is supplied with this voltage of the battery cells 40. A relay switch (e.g., a holder relay switch or a relay) 4 is interconnected as power switch between the first node 41 and the external load 60 and is controlled via a relay coil 3 to control the power supply to the external load 60.

The relay coil 3 is controlled via the relay driving circuit 11, and the relay driving circuit 11 is configured to control the relay coil 3 for emergency cut off between the battery cells 40 and the external load 60. The relay driving circuit 11 may be configured to control the current provided to the relay coil 3 via pulse width modulation (PWM) (e.g., via a PWM signal) applied to the holding relay switch 4 via the relay coil 3.

The relay driving circuit 11 receives a differential input via two input nodes that are connected upstream and downstream, respectively, of a shunt resistor 43 that is interconnected between the second node 42 and the external load 60. Hence, these input nodes provide a voltage drop over the shunt resistor 43 as an input signal to the relay driving circuit 11 to cut off the battery cells 40 from the external load 60 in an overcurrent situation. The relay driving circuit 11 may receive other input signals, such as signals related to temperatures of the battery cells 40, or may not receive any input signal at all.

Figure 2:
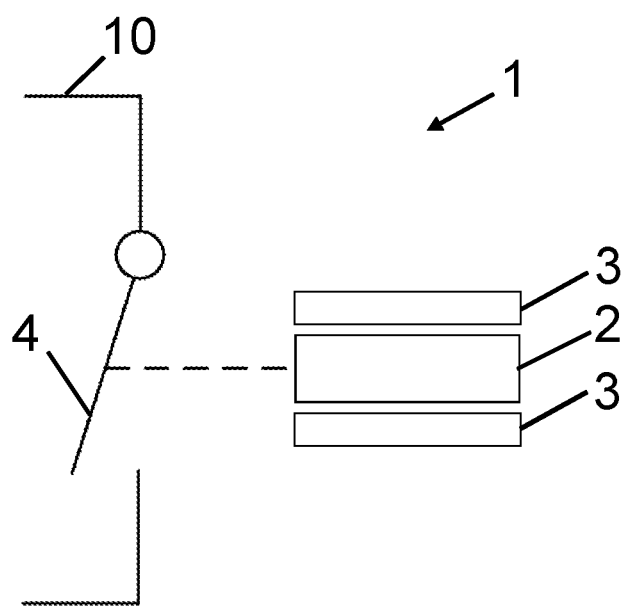
FIG. 2 is a schematic illustration of a relay according to an embodiment.
Figure 3:
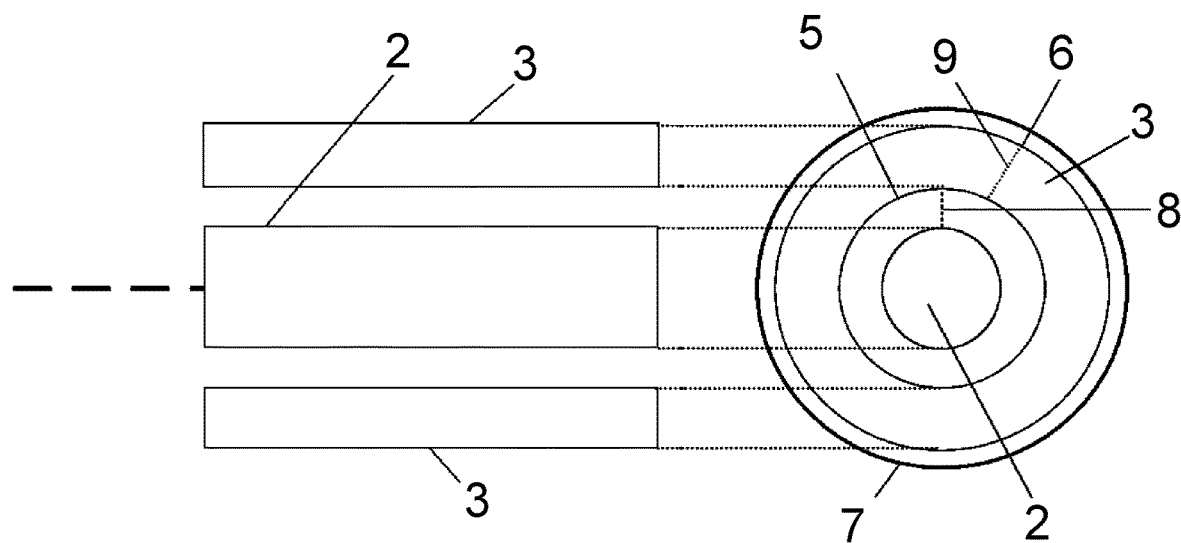
FIG. 3 is a schematic illustration of a detailed view of the relay shown in FIG. 2.

FIGS. 2 and 3 illustrate a relay 1 according to an embodiment. The relay 1 includes a relay coil 3 and a relay switch 4 as primary components. These components may be considered parts of the relay 1 but may also be considered parts of the relay driving circuit 11. The relay coil 3 includes a coil wire that is helically wound on (e.g., around) a hollow cylindrical core so as to form a hollow cylindrical coil 3. A relay pallet 2 is disposed in the central cavity of the relay coil 3 and is connected to the relay switch 4. Thus, a magnetic field generated by the relay coil 3 actuates the relay switch 4 via the relay pallet 2. The relay switch 4 is arranged in a load circuit 10 and is configured to allow a current to flow in (or through) the load circuit 10 (e.g., in a closed state) or to cut a current in the load circuit (e.g., in an open state). As shown in FIG. 3, the relay coil 3 is arranged within a magnetic bucket 7 that also has a hollow cylindrical form and fits the coil 3.

As further shown in the cross-sectional view of FIG. 3, the relay coil 3 has a thickness in a radial direction as it is formed of multiple layers of wound coil wire. For example, the coil wire is wound around a core (e.g., around the relay pallet 2) starting with a coil beginning 5 forming an innermost layer of the relay coil 3. The coil wire is then wound around the core multiple times until a coil end 6 is laid upon an outermost layer of the relay coil 3. As indicated by the dotted lines in FIG. 3, a first parasitic capacitance 8 is formed between the coil beginning 5 and the relay pallet 2, and a second parasitic capacitance 9 is formed between the coil end 6 and the relay pallet 2.

Figure 4:
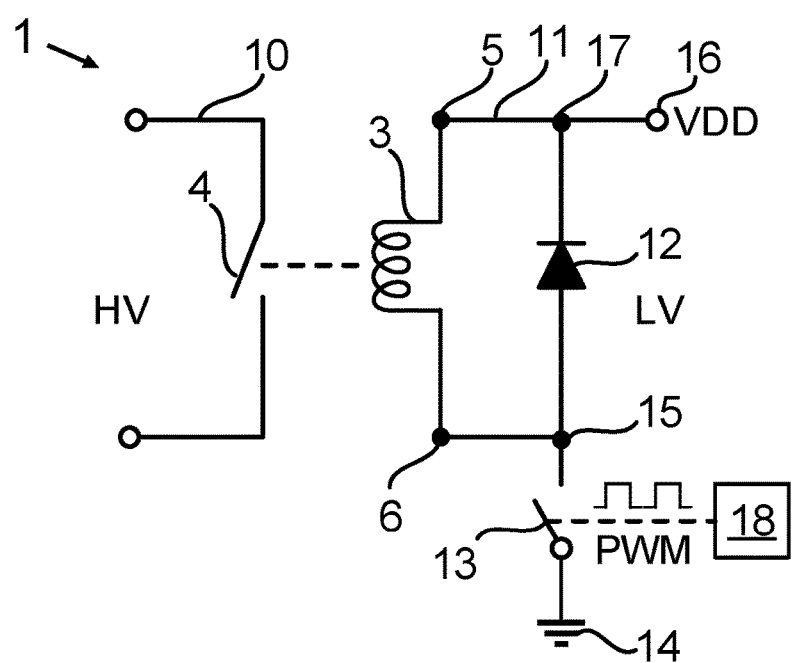
FIG. 4 is a schematic illustration of a relay according to an embodiment.

FIG. 4 schematically illustrates a wiring diagram of a relay 1 according to an embodiment. The relay 1 includes a low voltage (LV) relay driving circuit 11 including a relay coil and a high voltage (HV) load circuit 10 including a relay switch 4 that is controlled by the relay coil 3. In the relay driving circuit 11, the coil beginning 5 is connected to a LV supply voltage VDD 16 via a fourth node 17. The coil end 6 is connected to ground 14 via a third node 15 and a switch 13. The switch 13 is controlled via a PWM controller 18 that opens and closes the switch 13 based on a PWM signal. A freewheeling diode 12 is connected in parallel with the relay coil 3 between the third node 15 and the fourth node 17 with its anode pointing to the third node 15.

Figure 5:
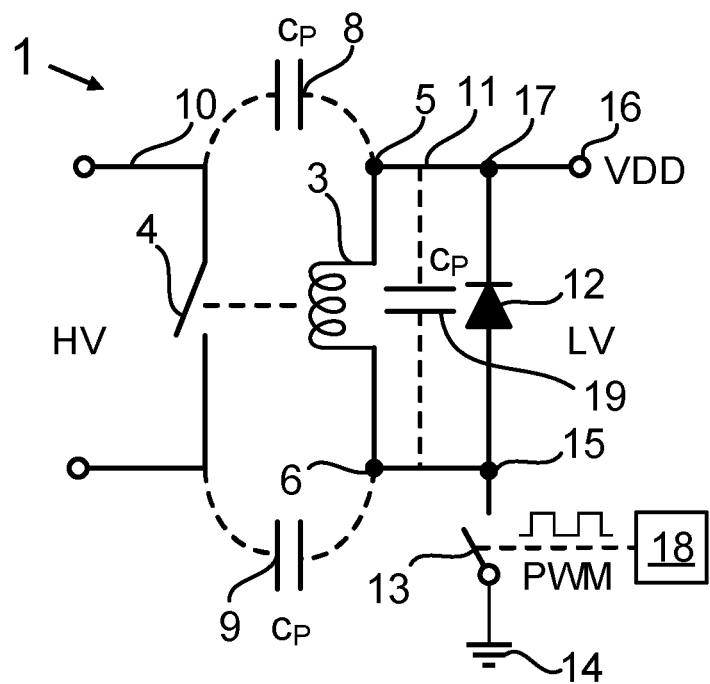
FIG. 5 is a schematic illustration of a relay according to an embodiment.

As illustrated in the extended wiring diagram of FIG. 5, a first parasitic capacitance $C_P$ 8 is formed between the relay beginning 5 and the load circuit 10 (e.g., between the relay beginning 5 and the relay switch 4), and a second parasitic capacitance $C_P$ 9 is formed between the relay end 6 and the load circuit 10 (e.g., between the relay end 6 and the relay switch 4). The difference in the links of the parasitic capacitances $C_P$ 8, 9 to the load circuit 10 (e.g., the relay switch 4) is for illustrative purposes only. The parasitic capacitances $C_P$ 8, 9 both link to the relay switch 4 (e.g., the relay pallet 2). The first parasitic capacitance $C_P$ 8 is greater than the second parasitic capacitance $C_P$ 9 as a distance between the coil beginning 5 and the relay pallet 2 is smaller than between the coil end 6 and the relay pallet 2 (see, e.g., FIG. 3). A third parasitic capacitance $C_P$ 19 is formed in parallel with the relay coil 3.

Figure 6:
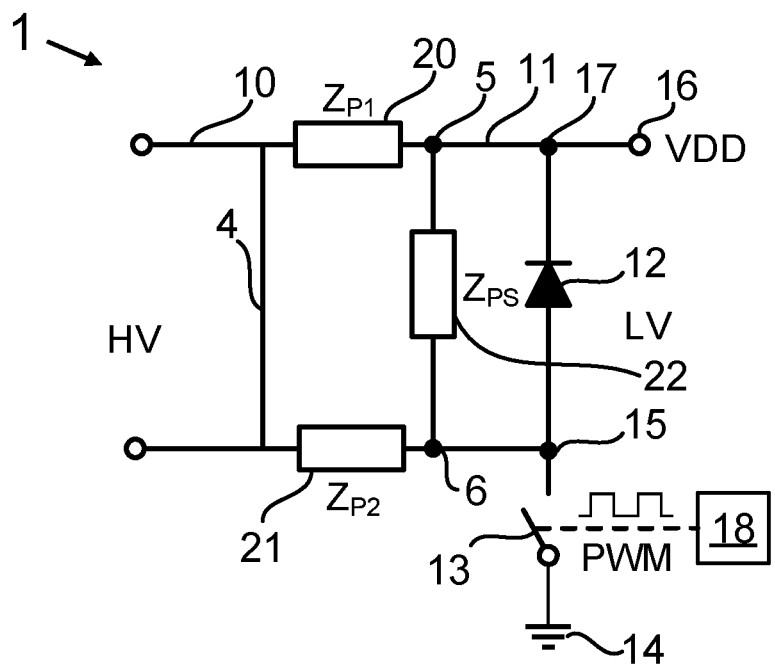
FIG. 6 is a schematic illustration of a relay according to an embodiment.

FIG. 6 shows an abstract wiring diagram of the relay 1 as a four pole relay according to an embodiment. The load circuit 10 is illustrated with closed relay switch 4 (e.g., with the relay switch 4 in a closed state). Further, the first parasitic capacitance 8 is illustrated as first complex parasitic coupling impedance $Z_{P1}$, and the second parasitic capacitance 9 is illustrated as second complex parasitic coupling impedance $Z_{P2}$. Further, the relay coil 3 and the third parasitic capacitance 19 are together illustrated as complex coil impedance 22. In FIG. 6, the first complex parasitic coupling impedance $Z_{P1}$ is different than (e.g., is unequal from) the second complex parasitic coupling impedance $Z_{P2}$ due to the relay coil's 3 asymmetry with respect to coil beginning 5 and end 6 as shown in, for example, FIG. 3.

When the first complex parasitic coupling impedance $Z_{P1}$ is smaller than the second complex parasitic coupling impedance $Z_{P2}$, electromagnetic interference (EMI) transmission between the load circuit 10 and the relay driving circuit 11 occurs predominantly via the first complex parasitic coupling impedance $Z_{P1}$. When the PWM signal provided by the PWM controller 18 is the most significant source of EMI in the relay 1, this signal would then not strongly couple into the load circuit 10. However, when a main (or predominant or primary) source of EMI is located within the load circuit 10, the coil beginning 5 should be connected to the third node 15. In this embodiment, EMI transmission between the load circuit 10 and the relay driving circuit 11 would again predominantly occur via the first complex parasitic coupling impedance $Z_{P1}$ such that any EMI emitted by load circuit 10 would then predominantly be conducted away to ground via $Z_{P1}$ and the third node 15.

Figure 7:
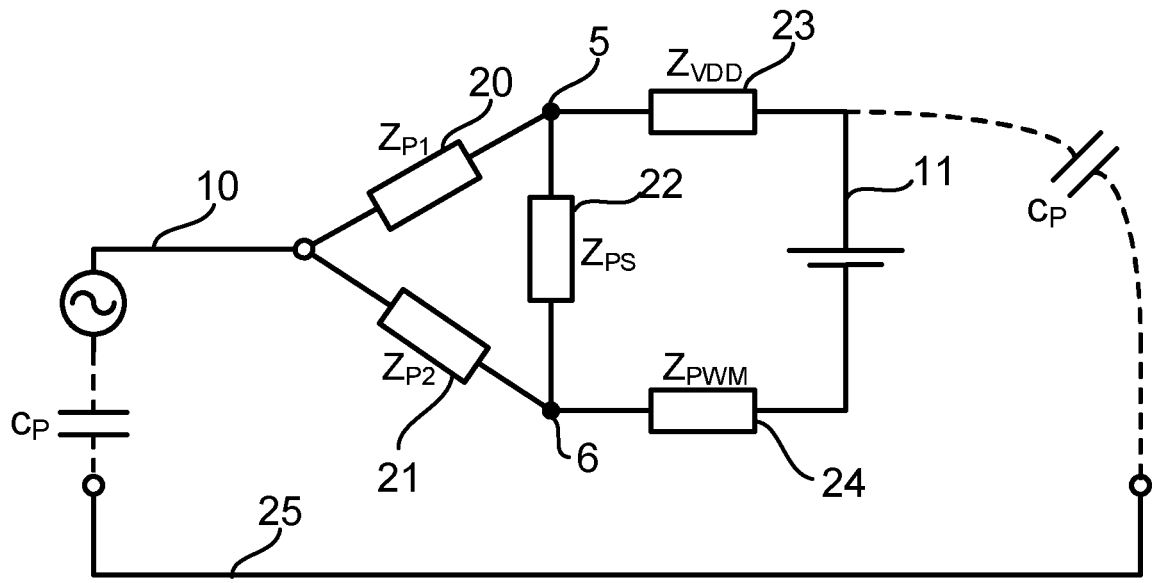
FIG. 7 is a schematic illustration of an electric vehicle according to an embodiment.

FIG. 7 schematically illustrates an electric vehicle according to an embodiment. The electric vehicle includes a relay driving circuit 11 and a load circuit 10, such as is illustrated in FIG. 6. For illustrative purposes, the first and second parasitic coupling impedances 20, 21 are connected to the same node (e.g., the relay driving circuit 11 is illustrated as a three pole relay). Further, line losses between the relay beginning 5 and the fourth node 17 shown in FIG. 6 as well as the influences of the supply voltage VDD 16 are summarized as fourth coupling impedance 23. Similarly, line losses between the relay end 6 and the third node 15 shown in FIG. 6 as well as the influences of switch 13 and PWM controller 18 are summarized as fifth coupling impedance 24.

In the vehicle shown in FIG. 7, a vehicle chassis 25 is capacitively coupled to both the load circuit 10 and to the supply voltage node 17 (see, e.g., FIG. 6) of the relay driving circuit 11. Hence, a capacitive coupling path exists from the load circuit 10 via the first parasitic coupling impedance 20 to the coil beginning 5 and from the relay driving circuit 11 to the vehicle chassis 25 via the fourth coupling impedance 23 and from there back to the load circuit 10. This coupling path has a high total coupling capacity and, thus, a low total coupling impedance.

By turning (e.g. winding) the relay coil 3 such that the second parasitic coupling impedance $Z_{P2}$ 21 is disposed within this coupling path instead of the first parasitic coupling impedance $Z_{P1}$ 20 (e.g., by connecting the coil end 6 to the fourth node 17 instead of the coil beginning 5), the total coupling capacity of the coupling path is reduced or minimized and, hence, the total coupling impedance of the coupling path is increased or maximized. Thus, any EMI transmission between load circuit 10 and relay driving circuit 11 across this coupling path is attenuated.

Figure 8:
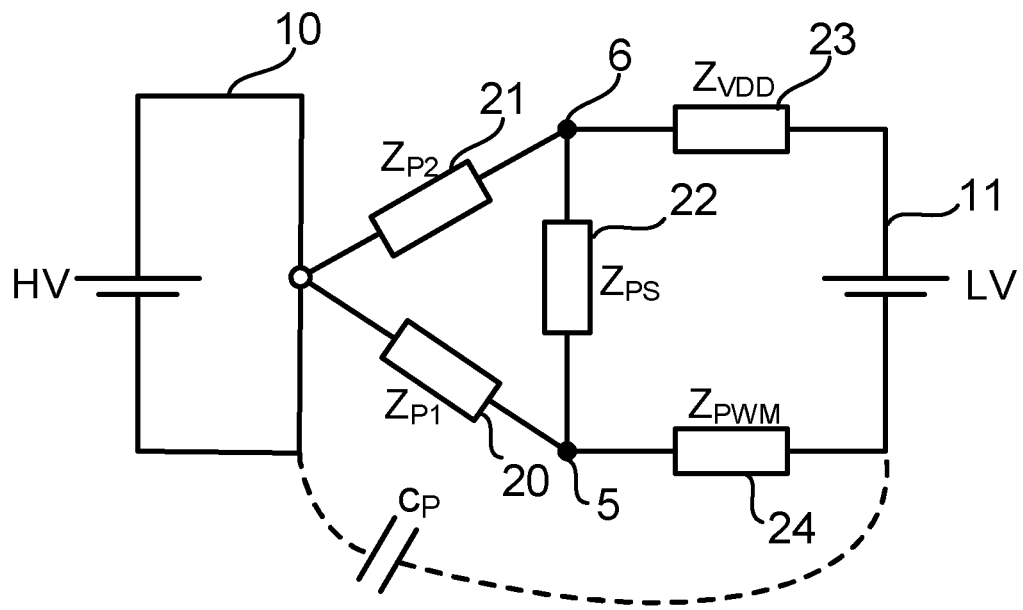
FIG. 8 is a schematic illustration of a high-voltage (HV) battery system according to an embodiment.

FIG. 8 schematically illustrates a high-voltage (HV) battery system according to an embodiment. The HV battery system includes a HV load circuit 10 and a relay driving circuit 11 that are configured similar to the similar circuits shown in FIG. 6. For illustrative purposes, the first and second parasitic coupling impedances 20, 21 are connected to the same node (e.g., the relay driving circuit 11 is illustrated as a three pole relay). Further, line losses between the relay end 6 and the fourth node 17 shown in FIG. 6 as well as the influences of the supply voltage VDD 16 are summarized as fourth coupling impedance 23. Also, line losses between the relay beginning 5 and third node 15 shown in FIG. 6 and the influences of the switch 13 and the PWM controller 18 are summarized as fifth coupling impedance 24.

In the battery system shown in FIG. 8, a capacitive coupling path exists from the load circuit 10 to the coil beginning 5 via the first parasitic coupling impedance $Z_{P1}$ 20 and from the relay driving circuit 11 to the load circuit 10 via the fifth coupling impedance 24. Again, this coupling path has a high total coupling capacity and, thus, a low total coupling impedance.

By positioning the relay coil 3 such that the second parasitic coupling impedance $Z_{P2}$ 21 is disposed within this coupling path instead of the first parasitic coupling impedance $Z_{P1}$ 20 (e.g., by connecting the coil end 6 to the third node 15 instead of connecting the coil beginning 5 to the third node 15), the total coupling capacity of the coupling path is reduced or minimized and, hence, the total coupling impedance of the coupling path is increased or maximized. Thus, any EMI transmission between load circuit 10 and relay driving circuit 11 across this coupling path is attenuated.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, for example, on a PCB or another kind of circuit carrier. The conducting elements may include (or may be formed of) metallization, such as surface metallizations and/or pins, and/or may include conductive polymers or ceramics. Further, electrical energy might be transmitted via wireless connections by using, for example, electromagnetic radiation and/or light.

Further, the various components of these devices may be a process or thread, running on one or more processors, in one or more computing devices, executing computer program instructions and interacting with other system components for performing the various functionalities described herein. The computer program instructions may be stored in a memory which may be implemented in a computing device by using a standard memory device, such as, for example, a random access memory (RAM). The computer program instructions may also be stored in other non-transitory computer readable media such as, for example, a CD-ROM, flash drive, or the like.

A person of skill in the art should recognize that the functionality of various computing devices may be combined or integrated into a single computing device, or the functionality of a particular computing device may be distributed across one or more other computing devices without departing from the scope of the exemplary embodiments of the present invention.

SOME REFERENCE SIGNS 1 relay
2 relay pallet
3 relay coil
4 relay switch
5 relay coil beginning
6 relay coil end
7 magnetic bucket
8 first parasitic capacitance
9 second parasitic capacitance
10 HV battery system (e.g., load circuit)
11 relay driving circuit
12 freewheeling diode
13 switch
14 ground
15 third node
16 supply voltage
17 fourth node
18 PWM controller
19 third parasitic capacitance
20 first parasitic coupling impedance
21 second parasitic coupling impedance
22 complex coil impedance
23 fourth coupling impedance
24 fifth coupling impedance
25 vehicle chassis
40 battery cell
41 first node
42 second node
43 shunt resistor
50 battery system
60 external load

What is claimed is:

1. A relay comprising:
a relay coil comprising a coil beginning and a coil end, the relay coil being connected to a relay driving circuit; and
a relay switch arranged in a load circuit,
wherein a first parasitic capacitance between the coil beginning and the relay switch is different than a second parasitic capacitance between the coil end and the relay switch, and
wherein one of the first parasitic capacitance and the second parasitic capacitance is arranged in a capacitive coupling path of electromagnetic interference between the relay driving circuit and the load circuit to attenuate or dissipate the electromagnetic interference.

2. The relay according to claim 1, wherein the relay switch comprises a relay pallet, and
wherein the first parasitic capacitance is between the coil beginning and the relay pallet, and the second parasitic capacitance is between the coil end and the relay pallet.

3. The relay according to claim 1, wherein the smaller one of the first parasitic capacitance and the second parasitic capacitance is arranged in a capacitive coupling path of electromagnetic interference between the relay driving circuit and the load circuit to attenuate the electromagnetic interference.

4. The relay according to claim 1, wherein the larger one of the first parasitic capacitance and the second parasitic capacitance is arranged in a capacitive coupling path of electromagnetic interference between the relay driving circuit and the load circuit to dissipate the electromagnetic interference.

5. The relay according to claim 1, wherein one of the coil beginning and the coil end is connected to ground via a third node and a switch,
wherein the other one of the coil beginning and the coil end is connected to a supply voltage via a fourth node, and
wherein the switch is configured to be controlled by a PWM controller.

6. The relay according to claim 5, wherein a source of electromagnetic interference between the relay driving circuit and the load circuit is arranged in the relay driving circuit, and
wherein the smaller one of the first parasitic capacitance and the second parasitic capacitance is connected to the third node.

7. The relay according to claim 6, wherein the PWM controller is the source of the electromagnetic interference between the relay driving circuit and the load circuit.

8. The relay according to claim 5, wherein a source of electromagnetic interference between the relay driving circuit and the load circuit is arranged in the load circuit, and
wherein the smaller one of the first parasitic capacitance and the second parasitic capacitance is connected to the fourth node.

9. The relay according to claim 1, wherein the second parasitic capacitance is smaller than the first parasitic capacitance.

10. A battery system comprising:
a plurality of battery cells electrically connected to each other in series between a first node and a second node; and
the relay according to claim 1,
wherein the load circuit is configured to connect the battery cells and an external load to each other, and
wherein the relay switch is interconnected between the first node or the second node and the external load.

11. The battery system according to claim 10, further comprising an inverter in the load circuit, the inverter being a source of electromagnetic interference between the relay driving circuit and the load circuit,
wherein the smaller one of the first parasitic capacitance and the second parasitic capacitance is connected to a fourth node.

12. A method for improving electromagnetic compatibility of a relay, the relay comprising: a relay coil having a coil beginning and a coil end and being connected to a relay driving circuit; and a relay switch arranged in a load circuit, the method comprising:
determining a first parasitic capacitance between the coil beginning and the relay switch;

determining a second parasitic capacitance between the coil end and the relay switch;

determining electromagnetic interference between the relay driving circuit and the load circuit;

determining a polarity of the relay coil in the relay driving circuit according to the determined first parasitic capacitance, the determined second parasitic capacitance, and the determined electromagnetic interference; and arranging one of the first parasitic capacitance and the second parasitic capacitance in a capacitive coupling path of electromagnetic interference between the relay driving circuit and the load circuit to attenuate or dissipate the electromagnetic interference.

13. The method according to claim 12, further comprising:

arranging the smaller one of the first parasitic capacitance and the second parasitic capacitance in a capacitive coupling path of the electromagnetic interference between the relay driving circuit and the load circuit to attenuate the electromagnetic interference.

14. The method according to claim 13, further comprising:

arranging the larger one of the first parasitic capacitance and the second parasitic capacitance in a capacitive coupling path of the electromagnetic interference between the relay driving circuit and the load circuit to conduct the electromagnetic interference away via the capacitive coupling path.

15. The method according to claim 13, wherein the capacitive coupling path comprises a vehicle chassis.

16. The method according to claim 12, further comprising:

arranging the larger one of the first parasitic capacitance and the second parasitic capacitance in a capacitive coupling path of the electromagnetic interference between the relay driving circuit and the load circuit to conduct the electromagnetic interference away via the capacitive coupling path.

17. The method according to claim 16, wherein the capacitive coupling path comprises a vehicle chassis.

* * * * *